United States Patent
Soukup

(10) Patent No.: US 11,088,537 B2
(45) Date of Patent: Aug. 10, 2021

(54) DEVICE TO PROTECT ALTERNATOR AND BATTERIES ON DIESEL ENGINES

(71) Applicant: Jiri Soukup, Richmond (CA)

(72) Inventor: Jiri Soukup, Richmond (CA)

( * ) Notice: Subject to any disclaimer, the term of this patent is extended or adjusted under 35 U.S.C. 154(b) by 0 days.

(21) Appl. No.: 16/353,808

(22) Filed: Mar. 14, 2019

(65) Prior Publication Data

US 2020/0295560 A1  Sep. 17, 2020

(51) Int. Cl.
  *H02H 7/18* (2006.01)
  *G01M 15/09* (2006.01)
  *G07C 5/08* (2006.01)
  *B60R 16/03* (2006.01)

(52) U.S. Cl.
  CPC .............. *H02H 7/18* (2013.01); *G01M 15/09* (2013.01); *G07C 5/0816* (2013.01); *B60R 16/03* (2013.01); *G07C 5/0825* (2013.01); *G07C 5/0833* (2013.01)

(58) Field of Classification Search
  CPC ....... H02H 7/18; G01M 15/09; G07C 5/0816; G07C 5/0825; G07C 5/0833; B60R 16/03
  See application file for complete search history.

(56) References Cited

U.S. PATENT DOCUMENTS

2016/0365813 A1\* 12/2016 Graefling ................ H02P 9/006

\* cited by examiner

*Primary Examiner* — Quan-Zhen Wang
*Assistant Examiner* — Rajsheed O Black-Childress
(74) *Attorney, Agent, or Firm* — Rimon PC; Marc Kaufman

(57) ABSTRACT

If the operator attempts to stop the engine incorrectly it may destroy the alternator diodes and the battery. A protective circuit is disclosed which keeps the alternator field connected to the battery until a signal such as the engine-oil pressure reports that the engine has stopped. The protective circuit is small and connects to existing engine control panels; it may also test itself without any risk of damaging the alternator or the battery.

5 Claims, 7 Drawing Sheets

DEVICE TO PROTECT ALTERNATOR AND BATTERIES ON DIESEL ENGINES

CROSS-REFERENCE TO RELATED TOPICS

U.S. Pat. No. 9,350,185
U.S. Pat. No. 7,442,887
U.S. Pat. No. 6,538,547

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

This invention is in the field of electrical and power control systems of diesel engines Stopping a diesel engine consists of two steps:
(1) Closing the fuel supply or decompressing the engine;
(2) Disconnecting the battery from the alternator field; where Step 2 must always come after the complete stop of the engine.

If Step 2 is performed before Step 1, the alternator often generates spikes of high voltage which destroys its rectification diodes. Without diodes, instead of direct current, the alternator produces an alternating current which destroys any connected batteries. On boats, a complete loss of electrical power may quickly become a matter of life and death.

On automobile diesel engines, both steps are performed automatically by pushing a single button or turning a single key, because the prime concern is a simple control similar to the control for the gasoline engines. However, many marine diesel engines have separate buttons or keys for the two steps; the prime concern there is to leave the engine running even when the electric power is lost. When the power is lost because of a lightning strike, depleted batteries, or faulty alternator, it is important that the diesel engine which runs without electricity remains running and allows to bring the boat to the safety of the shore.

The car diesel engines use a solenoid valve to control the fuel supply. This valve must be open when solenoid is activated, and it must be closed when solenoid not activated. Otherwise the valve would consume electricity when the engine is not running or be left with the fuel valve open when not running.

Alternators consist of high-inductance coils, and any sudden changes in its settings, control, or load result in a transient wave at its output. When the change is big, such as disconnecting the current into its rotor or completely disconnecting its load, this transient wave turns into high spikes of voltage and current at its output.

When someone stops the engine in the wrong order—first Step 2 and then Step 1, the current into its rotor (alternator field) is abruptly disconnected while the alternator is running. The resulting spike may destroy rectification diodes with grave consequences. Without diodes, the alternator produces alternating current instead of direct one, and that destroys batteries. Both voltage and/or current that can destroy the rectification diodes: Voltage in the direction the diode does not allow the current to flow; current in the direction the diode allows the current to flow.

The Operation Manuals for these engines warn, in BOLD letters, that executing these two steps in the wrong order may lead to grave consequences. However, nothing prevents an inexperienced or distracted operator from performing the wrong sequence, and the destruction of the diodes is usually not noticed until the total collapse of the electrical system. The misleading similarity between the key on the diesel engine panel and the ignition key of a typical automobile increases the probability of attempting to stop the engine by "just turning the key", thus turning off the alternator while the engine is still running.

There are two types of alternators: In Alternators with internal control, the control circuit is an integral part of the alternator. Alternators with external control assume a more sophisticated control of the output voltage which is provided by an external unit. An alternator with internal control has 3 contacts: ground, alternator output (30 A or more), and alternator field (about 0.3 A). An alternator with external control has an additional contact for its stator. In both situations, the alternator field connection provides the current which magnetizes the rotor of the alternator.

The most commonly used device today to protect the alternator diodes against the voltage spikes is a Transient Voltage Suppressor (TVS) diode inserted between the alternator output and ground. For example, see Alternator Spike Protector from the Balmar company. The TVS diode protects the alternator diodes by diverting the excessive output power to the ground. If the current through the diode and the voltage does not exceed a certain limit, the TVS diode remains on guard for the next spike. However, if the spike is large, the TVS diode burns like a fuse, and it does not protect the alternator against the next spike. This is the reason why this device is sold as a sacrificial circuit, not a permanent protection.

For more details on Alternator Spike Protection from Balmar, see www.westmarine.com.

When the TVS diode burns, however, the engine operator gets no feedback that the alternator protection has literally evaporated. It requires someone to open the engine compartment and visually inspect the device attached to the running alternator. The charred insulation would indicate that the TVS diode is not functional. The TVS Diode corrects the result of the problem: the alternator output, which involves high current. The current invention corrects the root of the problem: the floating voltage on the rotor which involves only low current. However, the TVS diode provides this partial protection for all spikes, including disconnecting the batteries from the alternator while the engine is running.

The advantage of the TVS Diode compared to the regular breaker is its speed. The spikes are usually so short that they would not throw the breaker off.

The name of the product from BlueSea Systems, Alternator Field Disconnect (AFD), can be misleading. This device is a part of the main battery switch, and it protects against spikes caused by a sudden disconnection of the batteries from a running alternator.

For more details on Alternator Field Disconnect from Blue Sea Systems, see www.bluesea.com

BRIEF SUMMARY OF THE INVENTION

This invention monitors whether the engine is running and protects the alternator by keeping it connected to the battery until the engine stops. The signal from the oil-pressure gauge on the engine can be used as the indicator whether the engine is moving.

DETAILED DESCRIPTION OF THE INVENTION

Figure 1:
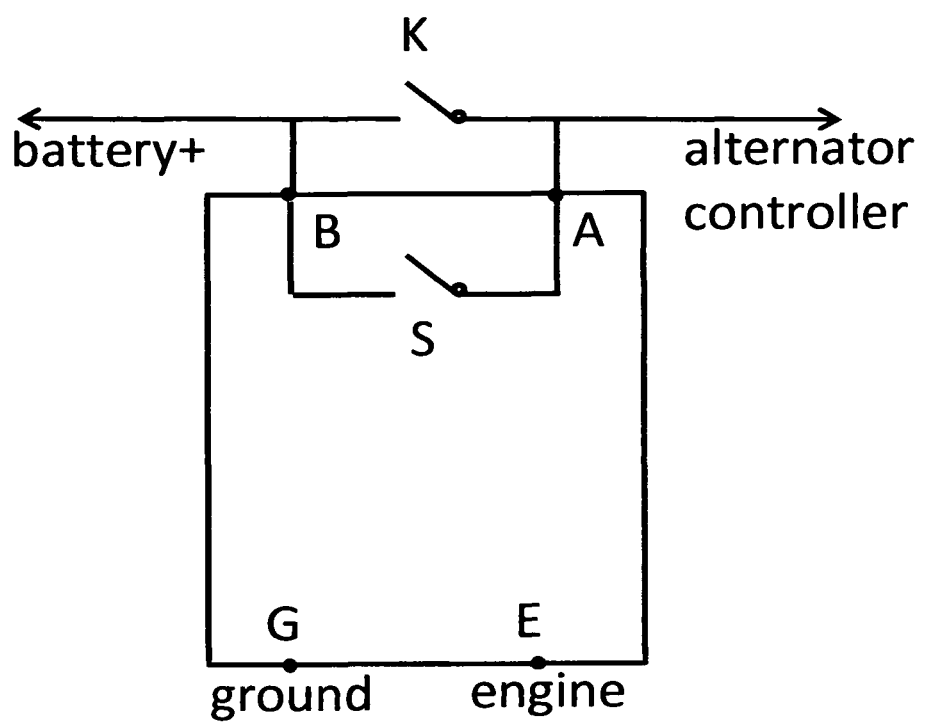
FIG. 1 shows the basic concept of the protective device. After connecting power for the alternator with control panel key K and starting the engine, internal switch S connects and stays connected until the engine stops, If, by mistake, the operator disconnects K before the engine stops, it has no effect.

The invention is a circuit with four contacts as shown in FIG. 1:

K is the engine K or the engine power switch on the engine panel;
B connects to the battery + side of K;
B=1 for battery voltage, B=0 for floating or ground;
A connects to the alternator side of K;
G connects to the battery −, assumed to be also ground;
E connects to the engine sensor; E=1 for engine running, E=0 for not running.

Internal automated switch S is between contacts B and A. Depending on the position of this switch, the circuit can be in two states:
S=ON, protecting the alternator by bridging K;
S=OFF, protection disabled.
The initial state is S=OFF.
The transfers between these two states are controlled by these rules:
If E=0 then S turns to OFF.
If E=1 and A=1, then S turns to ON.

When starting the engine, S is OFF. As soon as the engine starts running, S turns ON, and it stays there as long as the engine is running, regardless of whether someone disconnects key K or not. When the engine stops, S turns OFF and K works as if there were no protection circuit.

Figure 2:
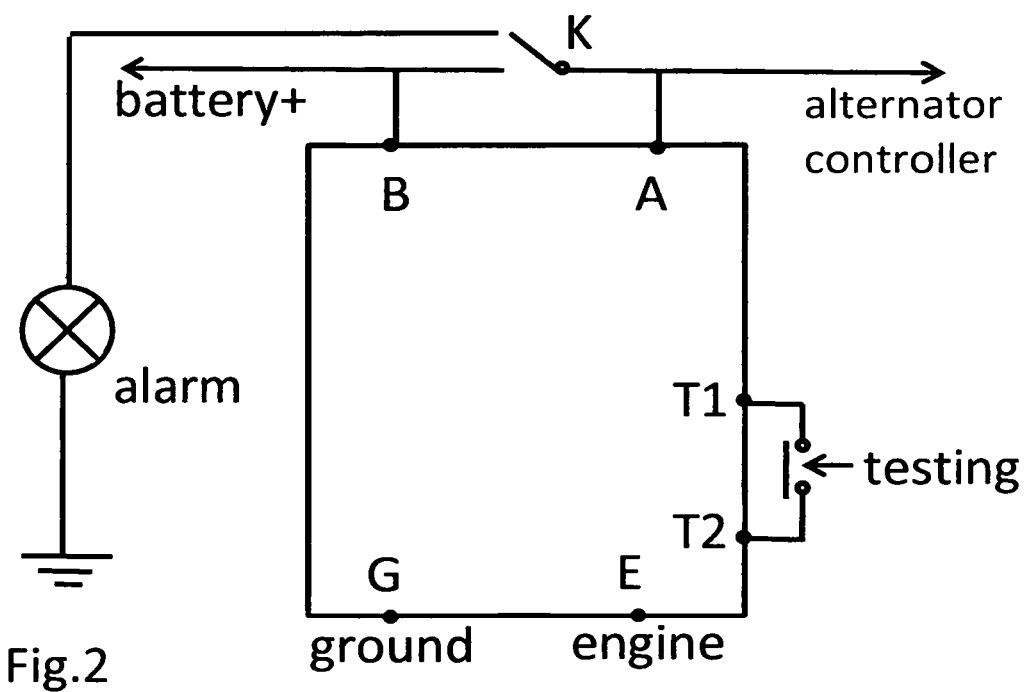
FIG. 2 shows the protective device with an alarm which warns the operator about the device covering the dangerous situation. The arrangement works only if the engine key unit has a spare contact for its "alternator not connected" position. External push button or spring switch connected to outlets T1 and T2 allows to test the functionality of the protection device without risk of damaging the alternator. For how these two features work, see the text above.

No protective device is useful unless we can periodically test that it is still operational. FIG. 2 shows the circuit from FIG. 1 with additional contacts T1 and T2 for such off-line testing. When the external push-button or switch connects T1 with T2, the value of E is internally overwritten with 1 (engine running).

The following testing procedure is done with the engine not running, so there is no danger of any damage:
Turn K ON, and you must hear the buzzing as if the oil pressure is low.
Push and hold the test button, the buzzing must stop.
While holding the test button, turn K to OFF, the buzzing must not stop.
Release the test button, the buzzing must stop.

Figure 6:
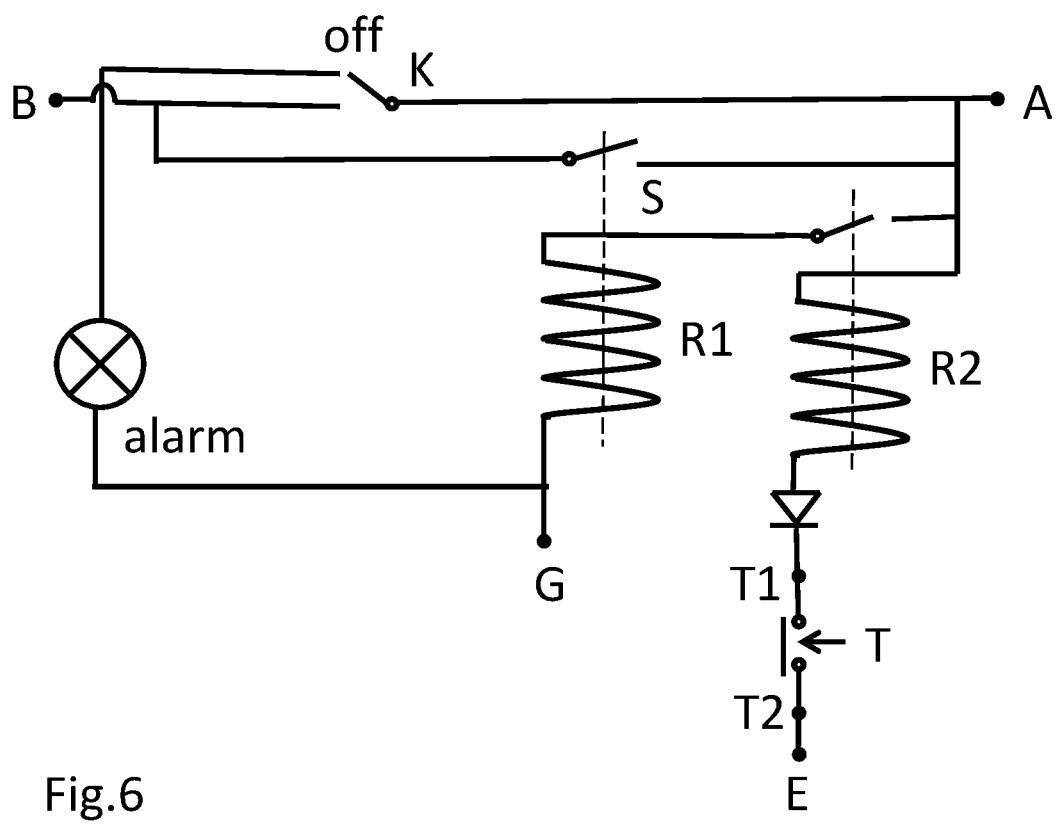
FIG. 6 shows the protection device from FIG. 5 but with an added alarm which warns the operator about the dangerous situation covered by the protective device. The operator should turn ON the key K as a precaution, but it is not necessary. This arrangement works only if the key unit on the control panel has a contact for the OFF position.

The protective device contains relays and/or other parts which also may fail. The probability of that happening is very small but, generally, running on the protection device is less safe than turning the K back to ON. For this reason, and also for training the operator, it is useful to issue a signal, auditory or visual, warning that the wrong sequence of commands has been used, and the operator should turn K back to the ON position. If K has a contact for the OFF position, we can connect this alarm as shown in FIG. 6. The alarm is activated when K is OFF and the engine is running. How does it work: If K is OFF and A is ON, E must be 1 (engine running) and the alarm is activated. When engine stops running A changes to OFF, and the alarm is deactivated.

Figure 3:
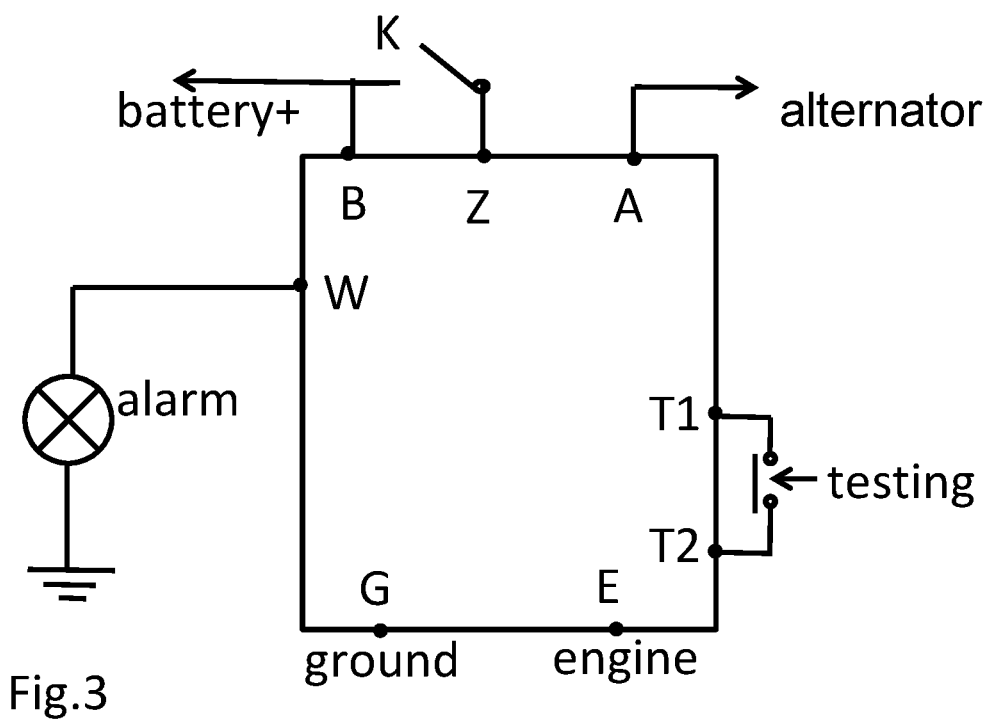
FIG. 3 shows the protective device with testing and alarm as in FIG. 2, but implemented without the special contact on the key unit. When the engine is running, the protective device connects internally outlets Z and W.

If key K does not have a contact for the OFF position, we have to use the configuration shown in FIG. 3. When K is OFF and the engine is running, the alarm is activated.

The inventor's preferred embodiment uses two relays and one diode. It is simple, robust, and the same device may be used for a wide range of engines.

Using the oil pressure as an indicator of whether the engine is running has the following advantages:
No additional gauge is required.
A wire with this signal is already under the control panel.
The small delay between the engine stopping and the oil pressure dropping to zero is beneficial. It guarantees that the power is not disconnected from the alternator too soon.
Disadvantage:
If the oil pressure drops because of engine problems, the protection device is disabled.

Another quite comparable embodiment with the same logic could be implemented with transistors.

Figure 4:
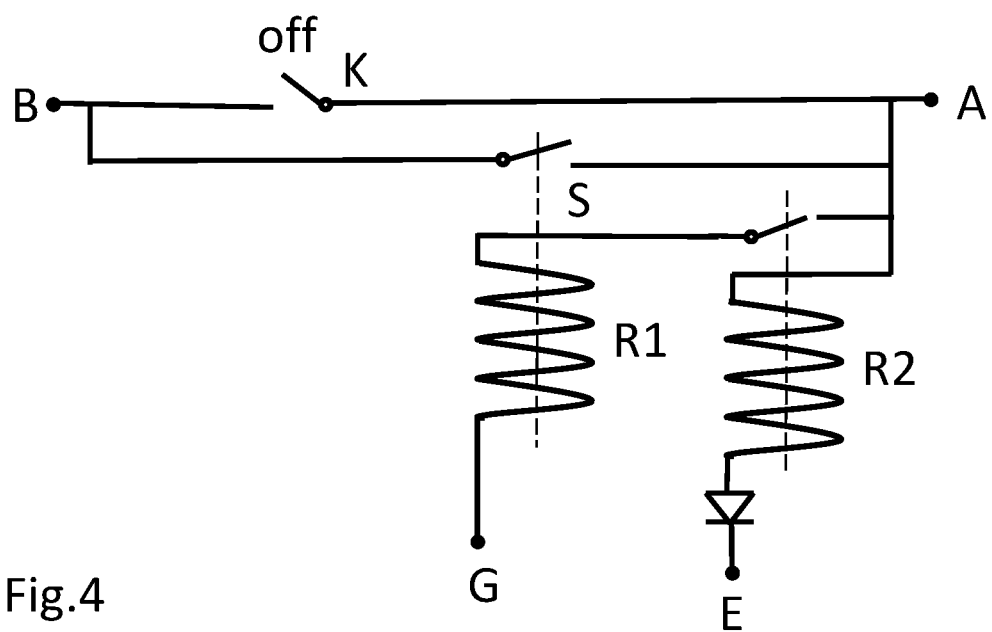
FIG. 4 shows the basic protective device implemented with two relays and one diode. E is connected to the oil-pressure gauge on the engine, which is grounded for low oil pressure, and disconnected for higher pressure. A wire from this gauge is already coming to the low-oil-pressure warning light on the panel. The diode is used to avoid interference with other wires connected to this gauge.

FIG. 4 shows this embodiment. The circuit connects to four points under the control panel of the diesel engine:
B=battery +
G=ground (battery −)
A=alternator field
P=oil pressure gauge (ground when low pressure)
It has the following components and connections:
R1, R2=relays
D=diode
K=panel or key switch is a part of the circuit but already exists on the engine panel.

Note the difference between the values of E in FIGS. 1-3, and P in FIGS. 4-7.

| | | |
|---|---|---|
| Engine not running: | E = 0 | P = ground |
| Engine running: | E = 1 | P floating, not connected to anything |

When the engine is running, P is not connected to anything, A is connected to B by K, R2 is OFF, and R1 is ON. When the stop is executed properly, the engine stops first, then P connects to ground, R2 turns to ON, and R1 turns to OFF. When, as the next step, the operator disconnects K, R2 turns OFF, and the circuit draws no current after this.

When the operator incorrectly disconnects K before stopping the engine, A remains connected with B through R1 as long as the engine is running. Only when the engine stops, P connects to ground, R2 turns ON, and turns R1 OFF, which disconnects A from B, and R2 also turns OFF. Again, the circuit draws no current after this.

The device provides permanent protection against executing the wrong sequence:

If the Steps are executed correctly, the device does not interfere.

In case of the wrong sequence, the device keeps the battery connected to the alternator as long as the engine is running. Dangerous spikes are eliminated.

The device takes no power when the engine is not used, and only negligible power when it is running.

The device is inexpensive, with all connections under the control panel, and easy to install on both old and new engines.

In order to use any safety equipment with confidence, though, we must be able to test it. Not only before installing it but also regularly during its use. We must test with the engine off though, for this test must not risk damage to the alternator.

Figure 5:
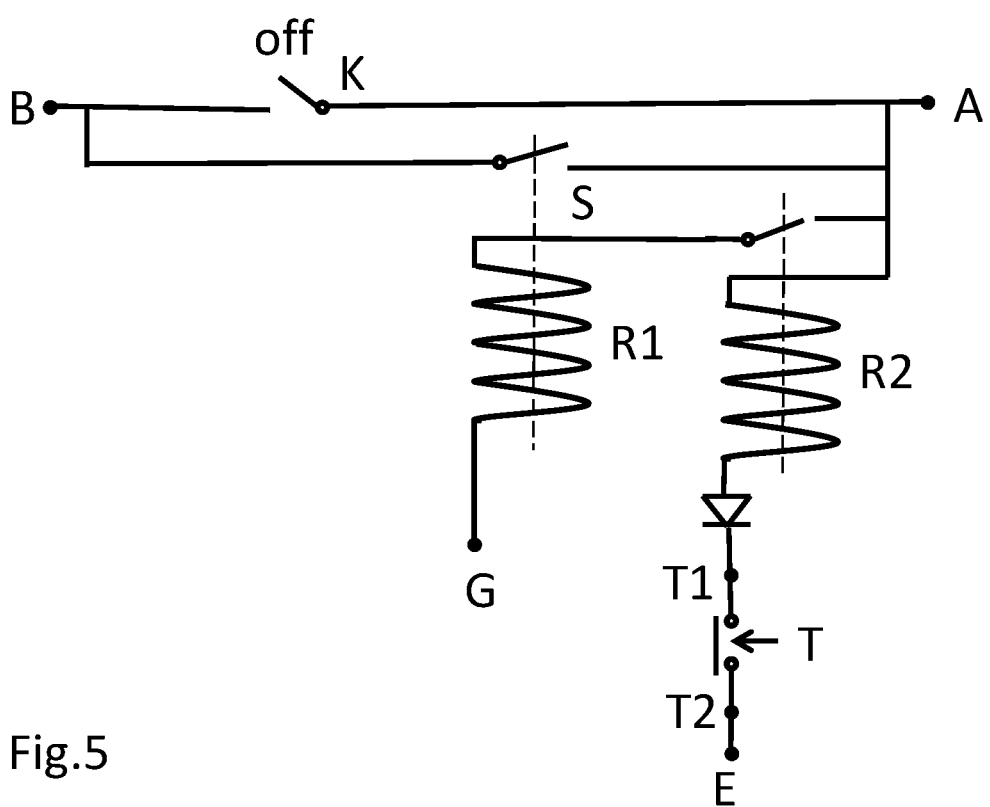
FIG. 5 shows the protection device from FIG. 4 with added testing of its own functionality. It does it by simulating the unwanted situation while the engine is not running. For the testing sequence, see the text above.

In another preferred embodiment, we add a spring switch or a push button T to the circuit—see FIG. 5, so we can test the device in this way:

With the engine not running, connect K. You should hear the alarm

Push on T and hold it, the alarm should stop
While holding T, disconnect K, the should start again
Release T, the alarm should stop The testing requires all these steps, because we are really testing a finite state machine.

In another embodiment, if switch K has a contact for the OFF position, by placing the alarm between this position and G, see FIG. 6, the alarm will be activated when K is OFF and A is ON. In other words, the alarm will be activated when the operator made an error and the alarm continues while the protected device supplies battery power to the alternator until the engine stops.

Figure 7:
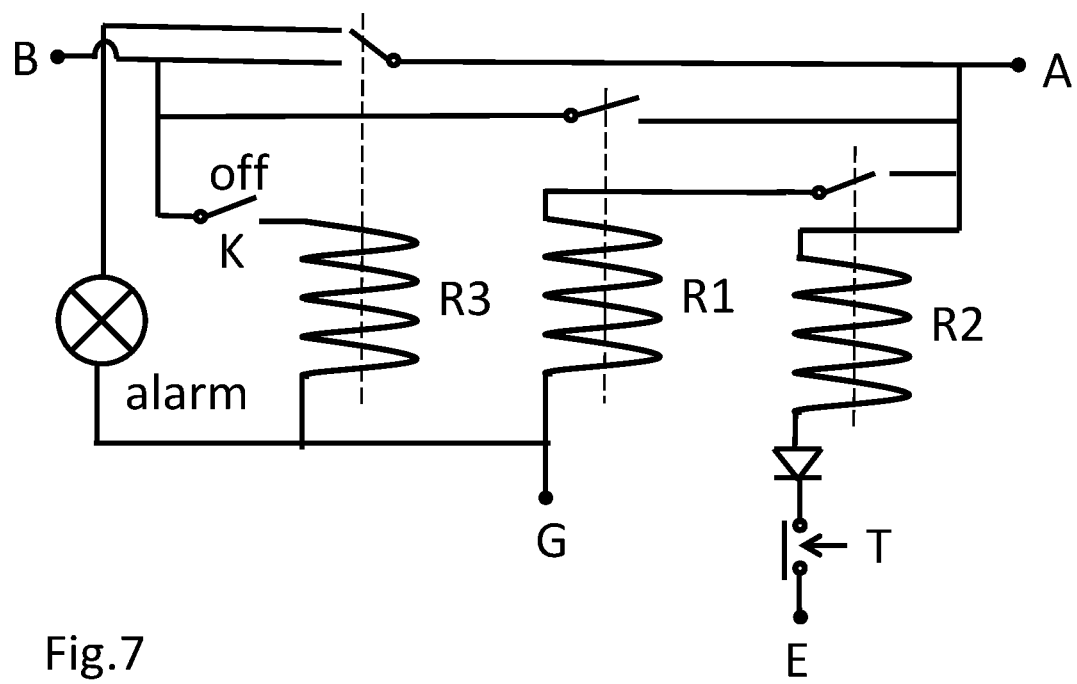
FIG. 7 shows the protection device with an alarm as in FIG. 6, but suitable for engines with the key unit that does not have a contact for the OFFposition.

In another embodiment, if switch K does not have a contact for the OFF position, we can implement an alarm by adding another relay which creates this contact, see R3 in FIG. 7. Its logic is otherwise identical with FIG. 6.

FIG. 8 shows the prototype of the protective device shown in FIG. 5. It was installed under the control panel of the inventor's 35 feet sailboat, Beneteau Oceanis 352 with a 30 hp Yanmar diesel engine. All connections were just a few inches long, right under the engine panel.

During a two-month sailing cruise in Florida and the Bahamas with a changing, inexperienced crew the device saved the expensive alternator and batteries twice. The first time the error was caused by the similarity between the key on the boat and the ignition key in most cars. The second time, the skipper was stopping the engine in a marina next to a noisy tugboat. He decompressed the engine and thought it stopped, but in the roar of the tugboat he did not hear that his engine had only slowed down and had not completely stopped. He returned the decompression lever to the normal position and disconnected the alternator. Five minutes later the tugboat departed, and the skipper found the engine running with the key in the OFF position. Fortunately the protective device had activated and prevented any damage.

The two relays in this prototype were automotive sealed parts 896H-1CH-D1 (12 VDC, 30 A) from SongChuan/Mouser Canada, and the spring switch 100G 437Y (6 A) was from Allegro Microsystems. The total current drawn by the protective device when the engine was running was 0.13 A. No power was used when the engine was not running. We did not continuously record the current drawn by our 12V 60 A Balmar Alternator through contact A in FIG. 5, but we never saw it exceed 0.3 A when sampled.

Magnetic relays may cause compass errors when in close proximity to the compass. The prototype shown in FIG. 8 was tested in different positions and distances relative to a compass. When the engine was not running (protective device not active) the compass did not change noticeably. When the engine was running (protective device activated) the compass position changed at most by 1 degree for any position we tried under the fiberglass control panel.

Conclusion:

TVS diode provides temporary protection against all spikes

AFD provides permanent protection against disconnecting batteries from a running alternator, which is the second main source of spikes, This invention provides permanent protection against the most frequently occurring spikes, caused by executing Step 2 before Step 1

The three solutions can be deployed simultaneously, they complement each other.

The invention claimed is:

1. A circuit protecting an alternator (A) and a battery against an operator turning an engine power switch (K) OFF before a diesel engine (E) stops and comprising an internal switch (S) in parallel with the engine power switch (K) and the circuit being configured to implement the following riles:

when the diesel engine is not running or stops, the internal switch (S) turns OFF, when the diesel engine (E) is running and the engine power switch (K) is ON, the internal switch (S) turns ON, once the internal switch (S) is ON, it remains ON regardless of the position of the engine power switch, and it turns OFF only when the engine stops running.

2. The circuit of claim 1 wherein an oil pressure gauge (P) is used to determine whether the diesel engine (E) is stopped.

3. The circuit of claim 2 wherein a connection to the oil pressure gauge includes a spring switch or a push button switch (T) which allows to test the protective circuit without disconnecting it from the battery and the alternator.

4. The circuit of claim 1 wherein an alarm is active when the diesel engine (E) is running and the engine power switch (K) is OFF.

5. A circuit of claim 1 wherein the rules are implemented with relays or transistors.

* * * * *